United States Patent
Lin et al.

(10) Patent No.: US 12,531,677 B2
(45) Date of Patent: Jan. 20, 2026

(54) USER EQUIPMENT AND METHOD FOR MULTI-TRP BASED PUSCH TRANSMISSION

(71) Applicant: SHARP KABUSHIKI KAISHA, Sakai (JP)

(72) Inventors: Chia-Hung Lin, Taipei (TW); Jia-Hong Liou, Taipei (TW)

(73) Assignee: SHARP KABUSHIKI KAISHA, Sakai (JP)

(*) Notice: Subject to any disclaimer, the term of this patent is extended or adjusted under 35 U.S.C. 154(b) by 456 days.

(21) Appl. No.: 17/958,392

(22) Filed: Oct. 1, 2022

(65) Prior Publication Data

US 2023/0103436 A1 Apr. 6, 2023

Related U.S. Application Data

(60) Provisional application No. 63/251,507, filed on Oct. 1, 2021.

(51) Int. Cl.
*H04L 5/00* (2006.01)
*H04W 72/23* (2023.01)

(52) U.S. Cl.
CPC .......... *H04L 5/0035* (2013.01); *H04L 5/0053* (2013.01); *H04W 72/23* (2023.01)

(58) Field of Classification Search
CPC ....... H04L 5/0035; H04L 5/0053; H04L 5/00; H04L 5/0032; H04W 72/23; H04W 72/20
See application file for complete search history.

(56) References Cited

U.S. PATENT DOCUMENTS

| | | | |
|---|---|---|---|
| 10,925,044 B1* | 2/2021 | Zhou | H04L 5/0044 |
| 11,224,059 B2* | 1/2022 | Wei | H04L 5/0092 |
| 11,553,466 B2* | 1/2023 | Jung | H04L 5/0048 |
| 2021/0212055 A1* | 7/2021 | Lin | H04L 5/0055 |
| 2021/0282167 A1* | 9/2021 | Wang | H04L 5/0044 |
| 2022/0030620 A1* | 1/2022 | Cirik | H04B 7/0695 |
| 2022/0131668 A1* | 4/2022 | Matsumura | H04L 5/0023 |
| 2023/0164786 A1* | 5/2023 | Wang | H04L 5/0037 370/329 |
| 2023/0171045 A1* | 6/2023 | Matsumura | H04B 7/0617 370/329 |
| 2023/0180242 A1* | 6/2023 | Cirik | H04L 5/0023 370/329 |

(Continued)

FOREIGN PATENT DOCUMENTS

| WO | WO-2021064959 A1 * | 4/2021 | ......... H04W 52/242 |
|---|---|---|---|
| WO | WO-2021143380 A1 * | 7/2021 | ......... H04B 7/0404 |

(Continued)

*Primary Examiner* — Edan Orgad
(74) *Attorney, Agent, or Firm* — ScienBiziP, P.C.

(57) ABSTRACT

A method performed by a user equipment (UE) for multiple transmission and reception points (multi-TRP) based physical uplink shared channel (PUSCH) transmission is provided. The method includes receiving, from a base station (BS), a Radio Resource Control (RRC) parameter that enables the UE to derive a default uplink (UL) spatial filter for PUSCH transmission; receiving, from the BS, a downlink control indication (DCI) format 0_0 that schedules the PUSCH transmission on a serving cell; determining one or two default UL spatial filters for the PUSCH transmission; and applying the one or two default UL spatial filters to perform the PUSCH transmission.

6 Claims, 3 Drawing Sheets

(56) References Cited

U.S. PATENT DOCUMENTS

| | | | |
|---|---|---|---|
| 2023/0209564 A1* | 6/2023 | Zhou | H04W 72/23 370/329 |
| 2023/0308237 A1* | 9/2023 | Yi | H04L 5/0094 |
| 2024/0195483 A1* | 6/2024 | Jang | H04W 52/242 |
| 2025/0261189 A1* | 8/2025 | Huang | H04W 72/566 |

FOREIGN PATENT DOCUMENTS

| | | | | |
|---|---|---|---|---|
| WO | WO-2021181667 A1 | * | 9/2021 | H04W 72/046 |
| WO | WO-2022015061 A1 | * | 1/2022 | H04W 72/1273 |
| WO | WO-2022197081 A1 | * | 9/2022 | H04W 72/232 |

* cited by examiner

USER EQUIPMENT AND METHOD FOR MULTI-TRP BASED PUSCH TRANSMISSION

CROSS-REFERENCE TO RELATED APPLICATION(S)

The present disclosure claims the benefit of and priority to U.S. Provisional Patent Application Ser. No. 63/251,507, filed on Oct. 1, 2021, entitled "DEFAULT SPATIAL RELATION AND PATHLOSS REFERENCE SIGNAL FOR MULTI-TRP BASED UPLINK CHANNEL TRANSMISSION," the content of which is hereby incorporated fully by reference into the present disclosure for all purposes.

FIELD

The present disclosure is related to wireless communication, and more specifically, to user equipment and method for multiple transmission and reception points (multi-TRP) based physical uplink shared channel (PUSCH) transmission.

BACKGROUND

Various efforts have been made to improve different aspects of wireless communication for cellular wireless communication systems, such as $5^{th}$ Generation (5G) New Radio (NR), by improving data rate, latency, reliability, and mobility. The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to a UE and a method for multi-TRP based PUSCH transmission.

In a first aspect of the present application, a method for multi-TRP based PUSCH transmission is provided. The method includes receiving, from a base station (BS), a Radio Resource Control (RRC) parameter that enables the UE to derive a default uplink (UL) spatial filter for PUSCH transmission; receiving, from the BS, a downlink control indication (DCI) format 0_0 that schedules the PUSCH transmission on a serving cell; determining one or two default UL spatial filters for the PUSCH transmission; and applying the one or two default UL spatial filters to perform the PUSCH transmission.

In an implementation of the first aspect, the one or two default UL spatial filters are determined according to a first control resource set (CORESET) in a case that the UE has not been provided with at least one spatial setting for a first physical uplink control channel (PUCCH) resource on the serving cell, and the one or two default UL spatial filters are determined according to the first PUCCH resource in a case that the UE has been provided with at least one spatial setting for the first PUCCH resource.

In another implementation of the first aspect, the first CORESET is a CORESET with a lowest identifier (ID) among a plurality of CORESETs configured by the BS.

In another implementation of the first aspect, the first PUCCH resource is a PUCCH resource with a lowest ID among a plurality of PUCCH resources configured by the BS.

In another implementation of the first aspect, two default UL spatial filters are determined based on the two spatial settings and applied by the UE to perform multi-TRP based PUSCH transmission, in a case that the first PUCCH resource has been activated with two spatial settings.

In another implementation of the first aspect, one default UL spatial filter is determined based on the one spatial setting and applied by the UE to perform single-TRP based PUSCH transmission, in a case that the first PUCCH resource has been activated with one spatial setting.

In another implementation of the first aspect, two default UL spatial filters are determined based on the two UL TCI states and applied by the UE to perform multi-TRP based PUSCH transmission, in a case that the first CORESET has been activated with two UL transmission configuration indication (TCI) states.

In another implementation of the first aspect, one default UL spatial filter is determined based on the one UL TCI state and applied by the UE to perform single-TRP based PUSCH transmission, in a case that the first CORESET has been activated with one UL TCI state.

In another implementation of the first aspect, the at least one spatial setting for the first PUCCH resource is provided to the UE via a Medium Access Control (MAC) control element (CE) that activates the at least one spatial setting.

In another implementation of the first aspect, the RRC parameter enables the UE to derive the default UL spatial filter for multi-TRP based PUSCH transmission.

In a second aspect of the present application, a UE for multi-TRP based PUSCH transmission is provided. The UE includes one or more processors and at least one memory coupled to at least one of the one or more processors, where the at least one memory stores a computer-executable program that, when executed by the at least one of the one or more processors, causes the UE to receive, from a BS, an RRC parameter that enables the UE to derive a default UL spatial filter for PUSCH transmission; receive, from the BS, a DCI format 0_0 that schedules the PUSCH transmission on a serving cell; determine one or two default UL spatial filters for the PUSCH transmission; and apply the one or two default UL spatial filters to perform the PUSCH transmission.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
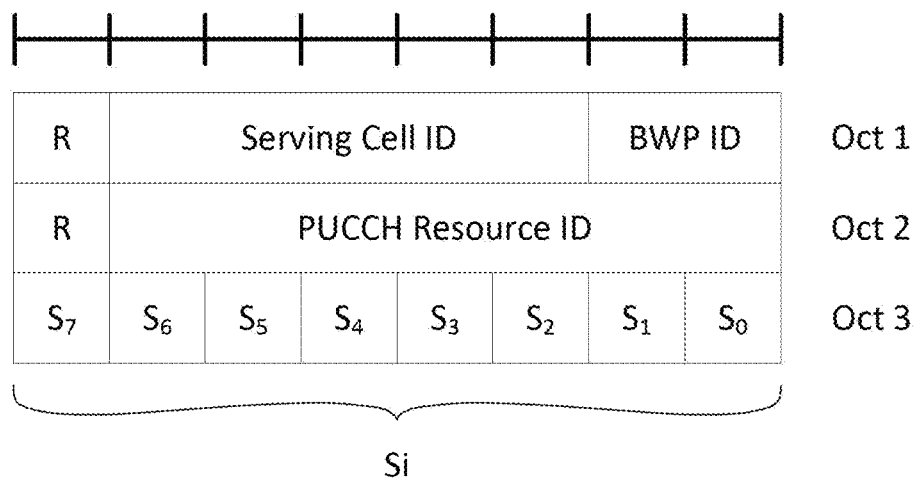
FIG. 1 is a diagram illustrating a PUCC spatial relation Activation/Deactivation MAC CE according to an example implementation of the present disclosure.

Abbreviations used in this disclosure include:

| Abbreviation | Full name |
| --- | --- |
| 3GPP | 3$^{rd}$ Generation Partnership Project |
| 5G | 5$^{th}$ Generation |
| BS | Base Station |
| BWP | Bandwidth Part |
| CORESET | Control Resource Set |
| DC | Dual Connectivity |
| DCI | Downlink Control Information |
| DL | Downlink |
| DM-RS | Demodulation Reference Signal |
| E-UTRA | Evolved Universal Terrestrial Radio Access |
| HARQ | Hybrid Automatic Repeat Request |
| ID | Identifier |
| IE | Information Element |
| LTE | Long Tenn Evolution |
| MAC | Medium Access Control |
| MAC CE | MAC Control Element |
| MCG | Master Cell Group |
| MN | Master Node |
| NR | New Radio |
| NW | Network |
| OFDM | Orthogonal Frequency Division Multiplexing |
| PCell | Primary Cell |
| PDCCH | Physical Downlink Control Channel |
| PDSCH | Physical Downlink Shared Channel |
| PHY | Physical (layer) |
| PUCCH | Physical Uplink Control Channel |
| PUSCH | Physical Uplink Shared Channel |
| QCL | Quasi-colocation |
| RAN | Radio Access Network |
| Rel | Release |
| RF | Radio Frequency |
| RRC | Radio Resource Control |
| RS | Reference Signal |
| SCell | Secondary Cell |
| SCG | Secondary Cell Group |
| SN | Secondary Node |
| TB | Transport Block |
| TCI | Transmission Configuration Indicator |
| TRP | Transmission Reception Point |
| TS | Technical Specification |
| Tx | Transmission |
| UE | User Equipment |
| UL | Uplink |
| URLLC | Ultra-Reliable and Low-Latency Communication |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be different in other respects and shall not be narrowly confined to what is illustrated in the drawings.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

The expression "at least one of A, B and C" or "at least one of the following: A, B and C" means "only A, or only B, or only C, or any combination of A, B and C." The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM). Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally UL resources to at least one UE within its radio coverage for DL and optionally UL packet transmissions. The BS may communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising of the SpCell and optionally one or more Secondary Cells (SCells). An SCG may refer to a group of serving cells associated with the Secondary Node (SN), comprising of the SpCell and optionally one or more SCells.

As previously disclosed, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3GPP may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and a UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Examples of some selected terms are provided as follows.

Antenna Panel: a conceptual term for UE antenna implementation. It may be assumed that a panel is an operational unit for controlling a transmit spatial filter (beam). A panel may include a plurality of antenna elements. In some implementations, a beam may be formed by a panel. Two panels may be needed to form two beams simultaneously. Such simultaneous beamforming from multiple panels may be subject to UE capability. A similar definition for "panel" may be possible by applying spatial receiving filtering characteristics.

Beam: the term "beam" in the present disclosure may be replaced by spatial filter. For example, when a UE reports a preferred gNB Tx beam, the UE is essentially selecting a spatial filter used by the gNB. The term "beam information" is used to provide information about which beam/spatial filter is being used/selected. Individual reference signals may be transmitted by applying individual beams (spatial filters). Thus, the beam or beam information may be represented by reference signal resource index(es).

DCI: DCI stands for downlink control information and there are various DCI formats used in LTE in PDCCH. The DCI format is a predefined format in which the downlink control information is packed/formed and transmitted in PDCCH.

TCI state: a TCI state contains parameters for configuring a QCL relationship between one or two DL reference signals and a target reference signal set. For example, a target reference signal set may be the DM-RS ports of PDSCH or PDCCH.

HARQ: A functionality ensures delivery between peer entities at Layer 1 (e.g., Physical Layer). A single HARQ process supports one transport block (TB) when the physical layer is not configured for downlink/uplink spatial multiplexing, and when the physical layer is configured for downlink/uplink spatial multiplexing, a single HARQ process supports one or multiple TBs. There is one HARQ entity per serving cell. Each of HARQ entity supports a parallel (number) of DL and UL HARQ process.

In Release-16 (Rel-16) NR, multiple TRPs (multi-TRP) based PDSCH repetition may be applied, e.g., for URLLC purpose. The reliability of PDSCH transmission under multi-TRP scenario is enhanced by PDSCH repetition. Based on the development of PDSCH enhancement in multi-TRP, the enhancement of other physical channels (e.g., PUSCH, PDCCH, and PUCCH) is to be discussed in Rel-17. Basically, multi-TRP based UL transmission will apply multiple spatial relation information (also referred to as spatial settings in the present disclosure) including beam information, path loss reference signal (PL-RS) information and precoder information to transmit the same data toward different TRPs. Therefore, in order to perform multi-TRP based UL transmission, multiple spatial settings are required to be instructed or defined to a UE.

In multi-TRP based PUCCH transmission, each PUCCH resource may be activated with two spatial settings via a MAC CE. The contents of the spatial settings may be provided in an IE PUCCH-SpatialRelationInfo included in an RRC message. However, the UE may apply default spatial setting when the network does not provide the IE PUCCH-SpatialRelationInfo. In addition, the MAC CE used to activate two spatial settings per PUCCH resource for performing multi-TRP based PUCCH transmission may not be provided. Therefore, the UE may not be able to know how to derive or determine the default spatial setting for single-TRP based PUCCH transmission or multi-TRP based PUCCH transmission. The UE may only be able to apply the default spatial setting for single-TRP based PUCCH transmission. In such a situation, the problem may be how to instruct a UE to apply or derive one or more default spatial settings for multi-TRP based PUCCH transmission. The next problem may be how to define the default spatial setting for multi-TRP based PUCCH transmission. Since the default spatial setting is only supported for single-TRP based PUCCH transmission in the conventional NR (e.g., Rel-16 NR), the default spatial setting applied for multi-TRP based PUCCH transmission may need to be defined. Therefore, how to derive the default spatial relation and corresponding PL-RS(s) for multi-TRP based PUCCH transmission will be discussed in the present disclosure. In addition to the default spatial relation and PL-RS for multi-TRP based PUCCH transmission, the default spatial relation and PL-RS for multi-TRP based PUSCH transmission may also be required to be defined. It should be noted that the spatial relation may also be replaced with one of the following terms interchangeably in the present disclosure: UL TCI, UL spatial filter, and precoding.

In a previous release of NR (e.g., Rel-15 or Rel-16 NR), the default spatial setting is supported for single-TRP based PUCCH transmission. In a case that one or some of the following conditions listed below is or are satisfied, the spatial setting and power control for PUCCH transmission may be determined based on the default spatial setting, instead of the explicitly-signaled spatial setting.

A UE is not provided with pathlossReferenceRSs in PUCCH-PowerControl.

A UE is provided with enableDefaultBeamPL-For-PUCCH.

A UE is not provided with PUCCH-SpatialRelationInfo.

A UE is not provided with coresetPoolIndex value of 1 for any CORESET, or is provided with coresetPoolIndex value of 1 for all CORESETs, in ContolResourceSet and no codepoint of a TCI field, if any, in a DCI format of any search space set maps to two TCI states.

When applying the default spatial setting and PL-RS for PUCCH transmission, a spatial setting for PUCCH transmission from the UE is the same as or derived from a spatial setting for PDCCH reception by the UE in the CORESET with the lowest ID on the active BWP of the serving cell. In addition, the UE may determine an RS resource index $q_d$ providing a periodic RS resource configured with a qcl-Type set to 'typeD' in the TCI state or the QCL assumption of a CORESET with the lowest index in the active DL BWP of the serving cell.

For single-TRP based PUCCH transmission, only one spatial setting is needed for default beam and PL-RS setting. However, for multi-TRP based PUCCH transmission, more than one spatial setting may need to be defined for default beam and PL-RS setting. In addition, the trigger condition of multi-TRP based PUCCH transmission and single-TRP based PUCCH transmission may be different.

In addition to single-TRP based PUCCH transmission, the default spatial setting is also supported for single-TRP based PUSCH transmission. In a case that one or some of the following conditions listed below is or are satisfied, the spatial setting and power control for PUSCH transmission may be determined based on default spatial setting and PL-RS, instead of the explicitly-signaled spatial setting and PL-RS (if any).

Condition 1
  The PUSCH transmission is scheduled by DCI format 0_0 on serving cell c.
  The UE is not provided with PUCCH resources for the active UL BWP of serving cell c.
  The UE is provided with enableDefaultBeamPL-For-PUSCH0-0.

Condition 2
  The PUSCH transmission is scheduled by DCI format 0_0 on serving cell c.
  The UE is not provided with a spatial setting for PUCCH resources on the active UL BWP of the primary cell.
  The UE is provided with enableDefaultBeamPL-For-PUSCH0-0.

Condition 3
  The PUSCH transmission is scheduled by DCI format 0_0, and if the UE is provided with a spatial setting by PUCCH-SpatialRelationInfo for a PUCCH resource with a lowest index for active UL BWP b of each carrier f and serving cell c.

When applying the default spatial setting and PL-RS for PUSCH transmission, a spatial setting for PUSCH transmission from the UE is the same as or derived from a spatial setting for PDCCH reception by the UE in the CORESET with the lowest ID on the active BWP of the serving cell. In addition, the UE may determine an RS resource index providing a periodic RS resource configured with qcl-Type set to 'typeD' in the TCI state or the QCL assumption of a CORESET with the lowest index in the active DL BWP of the serving cell.

The UE may use the same spatial relation and RS resource index $q_d$ as for a PUCCH transmission in the PUCCH resource with the lowest index for PUSCH transmission.

In the present disclosure, mechanisms for supporting default spatial setting for multi-TRP based UL transmission (e.g., PUCCH transmission and/or PUSCH transmission) will be discussed. Implementations will be provided regarding when to determine default spatial setting and/or PL-RS for multi-TRP based UL transmission and how to configure multiple spatial setting for the spatial relation beam/PL-RS setting of multi-TRP based UL transmission.

A UE may report, to the network, whether the UE supports default spatial setting configuration and/or PL-RS for multi-TRP based UL transmission.

Conditions for Determining or Deriving Default Spatial Relation Information and/or PL-RS for Multi-TRP Based PUCCH Transmission In this section, various solutions are provided to handle the aforementioned issues related to supporting default spatial setting for multi-TRP based PUCCH transmission. If not specifically stated, the RRC parameters or special terms mentioned in the present disclosure may refer to 3GPP TS 38.211 V16.7.0, TS 38.212 V16.7.0, TS 38.213 V16.7.0, TS 38.214 V16.7.0, TS 38.321 V16.6.0, TS 38.331 V16.6.0.

In some implementations, the default spatial setting and PL-RS(s) may be derived to perform multi-TRP based PUCCH transmission if the following conditions are satisfied.

- The UE is not provided with pathlossReferenceRSs.
- The UE is not provided with PUCCH-SpatialRelationInfo.
- The UE is provided with an RRC parameter (e.g., enableDefaultBeamPL-ForMultiPUCCH) that instructs the UE to apply default spatial setting for multi-TRP based transmission. In some implementations, an RRC parameter (e.g., enableDefaultBeamPL-ForMultiPUCCH) may be used to instruct a UE to derive the default spatial relation and the corresponding PL-RS(s) to perform multi-TRP based PUCCH transmission. Such an RRC parameter (e.g., enableDefaultBeamPL-ForMultiPUCCH) may be included in the UplinkConfig field used to provide uplink channel related configuration. When enableDefaudtBeamPL-ForMultiPUCCH is present in the UplinkConfig field, the UE may derive the default spatial relation and the corresponding PL-RS(s) for multi-TRP based PUCCH transmission.
- The UE is not provided with coresetPoolIndex value of 1 for any CORESET, or is provided with coresetPoolIndex value of 1 for all CORESETs, in ControlResourceSet and no codepoint of a TCI field, if any, in a DCI format of any search space set maps to two TCI states.

In some implementations, the default spatial relation and corresponding PL-RS(s) may be derived to perform multi-TRP based PUCCH transmission if the following conditions are satisfied.

- The UE is not provided with pathlossReferenceRSs.
- The UE is not provided with PUCCH-SpatialRelationInfo.
- The UE is provided with a MAC CE that instructs the UE to apply default spatial relation information for multi-TRP based transmission. In some implementations, one or more fields included in a PUCCH spatial relation Activation/Deactivation MAC CE (e.g., R field or Si field) may be used to instruct whether to apply default spatial relation and PL-RS(s) for multi-TRP based PUCCH transmission.
- The UE is not provided with coresetPoolIndex value of 1 for any CORESET, or is provided with coresetPoolIndex value of 1 for all CORESETs, in ControlResourceSet and no codepoint of a TCI field, if any, in a DCI format of any search space set maps to two TCI states.

FIG. 1 is a diagram 100 illustrating a PUCCH spatial relation Activation/Deactivation MAC CE according to an example implementation of the present disclosure. As illustrated in FIG. 1, the MAC CE has a fixed size of 24 bits with following fields:

- Serving Cell ID: This field indicates the identity of the Serving Cell for which the MAC CE applies. The length of the field is 5 bits.
- BWP ID: This field indicates a UL BWP for which the MAC CE applies as the codepoint of the DCI bandwidth part indication field. The length of the field is 2 bits.
- PUCCH Resource ID: This field contains an identifier of the PUCCH resource ID identified by PUCCH-ResourceId. The length of the field is 7 bits.
- Si: If, in PUCCH-Config in which the PUCCH Resource ID is configured, there is a PUCCH Spatial Relation Info with PUCCH-SpatialRelationInfoId, configured for the UL BWP indicated by BWP ID field, Si indicates the activation status of PUCCH Spatial Relation Info with PUCCH-SpatialRelationInfoId equal to i+1. Otherwise, this field may be used to indicate whether to apply default spatial relation and corresponding PL-RS for multi-TRP based PUCCH transmission. If there is a PUCCH Spatial Relation Info with PUCCH-SpatialRelationInfoId configured for the UL BWP indicated by BWP ID field, the Si field is set to 1 to indicate PUCCH Spatial Relation Info with PUCCH-SpatialRelationInfoId equal to i+1 shall be activated. The Si field is set to 0 to indicate PUCCH Spatial Relation Info with PUCCH-SpatialRelationInfoId equal to i+1 shall be deactivated. The Si field corresponds to fields $S_7$-$S_0$, as illustrated in FIG. 1.
  - If there is no PUCCH Spatial Relation Info with PUCCH-SpatialRelationInfoId configured for the UL BWP indicated by the BWP ID field, all Si fields may be set to 0 or 1 to indicate whether to apply default spatial relation and PL-RS(s) for multi-TRP based PUCCH transmission.
- R: Reserved bit.
  - If there is no PUCCH Spatial Relation Info with PUCCH-SpatialRelationInfoId configured for the UL BWP indicated by the BWP ID field, the R field may be used to indicate whether to apply default spatial relation and PL-RS(s) for multi-TRP based PUCCH transmission.

It should be noted that if the R field is used to instruct whether to perform multi-TRP based PUCCH with default spatial relation and PL-RS(s), the Si field may be ignored when there is no PUCCH Spatial Relation Info with PUCCH-SpatialRelationInfoId configured for the uplink bandwidth part indicated by the BWP ID field.

In some implementations, the default spatial relation and PL-RS(s) may be derived to perform multi-TRP based PUCCH transmission if the following conditions are satisfied.

- The UE is provided with enableDefaultBeamPL-ForPUCCH.
- The UE is not provided with pathlossReferenceRSs.
- The UE is not provided with PUCCH-SpatialRelationInfo.
- The CORESET with the lowest ID on the active BWP is activated with 2 TCI states.
- The UE is not provided with coresetPoolIndex value of 1 for any CORESET, or is provided with coresetPoolIndex value of 1 for all CORESETs, in ControlResourceSet and no codepoint of a TCI field, if any, in a DCI format of any search space set maps to two TC states.

In some implementations, the default spatial relation and PL-RS(s) may be derived to perform multi-TRP based PUCCH transmission if the following conditions are satisfied.

The UE is provided with enableDefaultBeamPL-For-PUCCH.
The UE is not provided with pathlossReferenceRSs.
The UE is not provided with PUCCH-SpatialRelation-Info.
At least one CORESET on the active BWP is activated with 2 TCI states.
The UE is not provided with comsetPoolIndex value of 1 for any CORESET, or is provided with coresetPoolIndex value of 1 for all CORESETs, in ControlResourceSet and no codepoint of a TC field, if any, in a DCI format of any search space set maps to two TCI states.

In some implementations, the default spatial relation and PL-RS(s) may be derived to perform multi-TRP based PUCCH transmission if the following conditions are satisfied.

The UE is provided with enableDefaultBeamPL-For-PUCCH.
The UE is not provided with pathlossReferenceRSs.
The UE is not provided with PUCCH-SpatialRelation-Info.
Both CORESETs with the lowest ID and the second lowest ID on the active BWP are activated with one TCI state.
The UE is not provided with coresetPoolIndex value of 1 for any CORESET, or is provided with coresetPoolIndex value of 1 for all CORESETs, in ControlResourceSet and no codepoint of a TCI field, if any, in a DCI format of any search space set maps to two TCI states.

In view of the foregoing implementations, a UE may report, to the network, whether the UE supports default spatial setting configuration and/or PL-RS for multi-TRP based UL transmission, and the UE may determine the default spatial setting and/or PL-RS for multi-TRP based PUCCH transmission if at least one or any combination of the following conditions is satisfied:

The UE is not provided with pathlossReferenceRSs in PUCCH-PowerControl.
The UE is provided with enableDefaultBeamPL-For-PUCCH.
The UE is provided with an RRC parameter (e.g., enableDefaultBeamPL-ForMultiPUCCH) that instructs the UE to apply default spatial setting for multi-TRP based PUCCH transmission.
The UE is provided with a MAC CE that instructs the UE to apply default spatial relation information for multi-TRP based transmission.
The UE is not provided with PUCCH-SpatialRelation-Info.
The UE is not provided with coresetPoolIndex value of 1 for any CORESET, or is provided with coresetPoolIndex value of 1 for all CORESETs, in ControlResourceSet and no codepoint of a TCI field, if any, in a DCI format of any search space set maps to two TC states.
The CORESET with the lowest ID on the active BWP is activated with two TCI states.
At least one CORESET on the active BWP is activated with two TI states.
Both CORESETs with the lowest ID and the second lowest ID on the active BWP are activated with one TCI state.

Determination or Derivation of Default Spatial Relation and/or PL-RS(s) for Multi-TRP Based PUCCH Transmission If a UE performs (or is instructed to perform) multi-TRP based PUCCH transmission with default spatial relation and PL-RS, the default spatial relation and PL-RS may be derived based on at least one of the following alternatives:

A spatial setting for a PUCCH transmission from the UE is the same as or derived from a spatial setting for PDCCH receptions by the UE in the CORESET with the lowest ID on the active BWP of the serving cell. In some cases, the UE may be instructed to perform multi-TRP based PUCCH transmission with the default spatial relation, but the UE may switch to single-TRP based PUCCH transmission with the default spatial relation if the CORESET with the lowest ID on the active BWP of the serving cell is activated with (only) one TCI state. The default spatial relation may be derived by the TC state of the CORESET with the lowest ID on the active BWP of the serving cell.

A spatial setting for a PUCCH transmission from the UE is the same as or derived from a spatial setting for PDCCH receptions by the UE in the CORESET with the lowest ID among CORESETs that are activated with two TCI states on the active BWP of the serving cell. In some cases, the UE may be instructed to perform multi-TRP based PUCCH transmission with the default spatial relation, but the UE may switch to single-TRP based PUCCH transmission with the default spatial relation if all CORESETs on the active BWP of the serving cell are activated with only one TCI state. The default spatial relation may be derived by the TCI state of the CORESET with the lowest ID on the active BWP of the serving cell.

A spatial setting for a PUCCH transmission from the UE is the same as or derived from a spatial setting for PDCCH receptions by the UE in the CORESET with the lowest ID and/or the CORESET with the second lowest ID. In some cases, when the CORESET with the lowest ID is activated with two TCI states and the CORESET with the second lowest ID is activated with two TCI states, the default spatial relations for multi-TRP based PUCCH transmission may be derived by the TCI state with the lowest ID among the TCI states of both the CORESETs. In some cases, when the CORESET with the lowest ID is activated with one TCI state and the CORESET with the second lowest ID is activated with two TCI states, the default spatial relations for multi-TRP based PUCCH transmission may be derived by the TCI state of the CORESET with the lowest ID and the TCI state with the lowest ID of the CORESET with the second lowest ID. In some cases, when the CORESET with the lowest ID is activated with two TCI states and the CORESET with the second lowest ID is activated with one TCI state, the default spatial relations for multi-TRP based PUCCH transmission may be derived by the TC state with the lowest ID of the CORESET with the lowest ID and the TC state of the CORESET with the second lowest ID. In some cases, when the CORESET with the lowest ID is activated with one TCI state and the CORESET with the second lowest ID is activated with one TCI state, the default spatial relations for multi-TRP based PUCCH transmission may be derived by the TC state of the CORESET with the lowest ID and the TC state of the CORESET with the second lowest ID. It should be noted that if the CORESET with the lowest ID is activated with two TCI states, the default spatial relations for multi-TRP based PUCCH transmission may be only derived by the CORESET with the lowest ID; and if the CORESET with the lowest ID is activated with one TCI state, the default spatial relations for multi-TRP based PUCCH transmission may be derived by the CORESET with the lowest ID and the CORESET with the second lowest ID.

The UE may determine an RS resource index $q_d$ providing a periodic RS resource configured with qcl-Type set to 'typeD' in the TCI state or the QCL assumption of a CORESET with the lowest index in the active DL BWP of the serving cell. In some cases, the UE may be instructed to perform multi-TRP based PUCCH transmission with default PL-RSs, but the UE may switch to single-TRP based PUCCH transmission with default PL-RS if the CORESET with the lowest ID on the active BWP of the serving cell is activated with only one TCI state. The default PL-RS may be derived by the QCL assumption of the CORESET with the lowest ID on the active BWP of the serving cell.

The UE may determine an RS resource index $q_d$ providing a periodic RS resource configured with qcl-Type set to 'typeD' in the TCI state or the QCL assumption of a CORESET which is activated with two TCI states with the lowest ID on the active BWP of the serving cell. In some cases, the UE may be instructed to perform multi-TRP based PUCCH transmission with default PL-RSs, but the UE may switch to single-TRP based PUCCH transmission with default PL-RS if all CORESETs on the active BWP of the serving cell are activated with only one TC state. The default PL-RS may be derived by the QCL assumption of the CORESET with the lowest ID on the active BWP of the serving cell.

The UE may determine an RS resource index $q_d$ providing a periodic RS resource configured with qcl-Type set to 'typeD' in the TCI state or the QCL assumption of a CORESET with the lowest ID and/or a CORESET with the second lowest ID in the active DL BWP of the serving cell. In some cases, when the CORESET with the lowest ID is activated with two TCI states and the CORESET with the second lowest ID is activated with two TCI states, the default PL-RSs for multi-TRP based PUCCH transmission may be derived by the QCL assumption with the lowest ID of both the CORESETs. In some cases, when the CORESET with the lowest ID is activated with one TCI state and the CORESET with the second lowest ID is activated with two TCI states, the default PL-RSs for multi-TRP based PUCCH transmission may be derived by the QCL assumption of the CORESET with the lowest ID and the PL-RS with the lowest ID included in the QCL assumption of the CORESET with the second lowest ID. In some cases, when the CORESET with the lowest ID is activated with two TCI states and the CORESET with the second lowest ID is activated with one TCI state, the default PL-RSs for multi-TRP based PUCCH transmission may be derived by the PL-RS with the lowest ID included in the QCL assumption of the CORESET with the lowest ID and the QCL assumption of the CORESET with the second lowest ID. In some cases, when the CORESET with the lowest ID is activated with one TCL state and the CORESET with the second lowest ID is activated with one TCL state, the default PL-RSs for multi-TRP based PUCCH transmission may be derived by the QCL assumption of the CORESET with the lowest ID and the QCL assumption of the CORESET with the second lowest ID. It should be noted that if the CORESET with the lowest ID is activated with two TCI states, the default PL-RSs for multi-TRP based PUCCH transmission may be only derived by the CORESET with the lowest ID; and if the CORESET with the lowest ID is activated with one TCI state, the default PL-RSs for multi-TRP based PUCCH transmission may be derived by the CORESET with the lowest ID and the CORESET with the second lowest ID.

In view of the foregoing alternatives, if a UE applies/uses (or is instructed to apply/use) default spatial setting and PL-RS for the spatial setting (e.g., beam and PL-RS setting) of multi-TRP based PUCCH transmission, a spatial setting for multi-TRP based PUCCH transmission from the UE is the same as or derived from a spatial setting for PDCCH reception by the UE, e.g., the default spatial relation and PL-RS(s) may be derived by the spatial setting for PDCCH reception by the UE. The default spatial relation and PL-RS(s) may be derived based on one of the following options:

Option 1: The CORESET with the lowest ID on the active BWP of a serving cell. If the CORESET with the lowest ID is activated with two TCI states, these two TCI states may be directly applied for two default spatial settings and PL-RSs for multi-TRP based PUCCH transmission. If the CORESET with the lowest ID is activated with one TCI state, this TCI state may be (only) applied for default spatial setting and PL-RS for transmission, e.g., single-TRP based PUCCH transmission.

Option 2: The CORESET with the lowest ID among CORESETs that are activated with two TCI states on the active BWP of a serving cell. The TCI states of the CORESET with the lowest ID among CORESETs that are activated with two TCI states may be applied for two default spatial relation information used for a spatial setting for multi-TRP based PUCCH transmission. The first activated TCI state may be used for transmitting to a first TRP, which may be represented by transmission associated with CORESETPoolIndex valued 0. The second activated TCI state may be used for transmitting to a second TRP, which may be represented by transmission associated with CORESETPoolIndex valued 0.

Option 3: The CORESETs with the lowest ID and the second lowest ID on the active BWP of a serving cell. If the CORESET with the lowest ID is activated with two TCI states and the CORESET with the second lowest ID is activated with two TCI states, the TCI states with the lowest ID of both CORESETs may be applied for two default spatial relation information used for a spatial setting for multi-TRP based PUCCH transmission. If the CORESET with the lowest ID is activated with two TCI states and the CORESET with the second lowest ID is activated with one TCI state, the TCI state with the lowest ID of the CORESET with the lowest ID and the TCI state of the CORESET with the second lowest ID may be applied for two default spatial relation information used for a spatial setting for multi-TRP based PUCCH transmission. If the CORESET with the lowest ID is activated with one TCI state and the CORESET with the second lowest ID is activated with two TCI states, the TCI state of the CORESET with the lowest ID and the TCI state with the lowest ID of the CORESET with the second lowest ID may be applied for two default spatial relation information used for a spatial setting for multi-TRP based PUCCH transmission. If the CORESET with the lowest ID is activated with one TCI state and the CORESET with the second lowest ID is activated with one TCI state, the TCI state of the CORESET with the lowest ID and the TCI state of the CORESET with the second lowest ID may be applied for two default spatial relation information used for a spatial setting for multi-TRP based PUCCH transmission.

The serving cell in above options may be one of a PCell, an SCell, a scheduling cell or a scheduled cell. If the CORESET with the lowest ID is not activated with two TCI states, the UE may only apply one default spatial relation and PL-RS for PUCCH transmission. If all CORESETs are not activated with two TCI states, the UE may only apply one default spatial relation and PL-RS for PUCCH transmission.

Conditions for Determining or Deriving Default Spatial Relation Information and/or PL-RS for Multi-TRP Based PUSCH Transmission In some implementations, the default spatial relation and PL-RS(s) may be derived to perform multi-TRP based PUSCH transmission if the following conditions are satisfied.

The PUSCH transmission is scheduled by DC format 0_0 on serving cell c.

The UE is provided with an RRC parameter (e.g., enableDefaultBeamPL-ForMultiPUSCH0-0) that instructs the UE to apply default spatial relation information for multi-TRP based PUSCH transmission. In some implementations, an RRC parameter (e.g., enableDefaultBeamPL-ForMultiPUSCH0-0) may be used to instruct a UE to derive the default spatial relation and the corresponding PL-RS(s) to perform multi-TRP based PUSCH transmission. Such an RRC parameter (e.g., enableDefaultBeamPL-ForMulti-PUSCH0-0) may be included in the UplinkConfig field used to provide uplink channel related configuration. When enableDefaultBeamPL-ForMultiPUSCH0-0 is present in the UplinkConfig field, the UE may derive the default spatial relation and the corresponding PL-RS(s) for multi-TRP based PUSCH transmission.

In some implementations, the default spatial relation and PL-RS(s) may be derived to perform multi-TRP based PUSCH transmission if the following conditions are satisfied.

The PUSCH transmission is scheduled by DCI format 0_0 on serving cell c.

The UE is not provided with PUCCH resources for the active UL BWP of serving cell c.

The UE is provided with an RRC parameter (e.g., enableDefaultBeamPL-ForMultiPUSCH0-0) that instructs the UE to apply default spatial relation information for multi-TRP based PUSCH transmission. In some implementations, an RRC parameter (e.g., enableDefaultBeamPL-ForMultiPUSCH0-0) may be used to instruct a UE to derive the default spatial relation and the corresponding PL-RS(s) to perform multi-TRP based PUSCH transmission. Such an RRC parameter (e.g., enableDefaultBeamPL-ForMulti-PUSCH0-0) may be included in the UplinkConfig field used to provide uplink channel related configuration. When enableDefaultBeamPL-ForMultiPUSCH0-0 is present in the UplinkConfig field, UE may derive the default spatial relation and the corresponding PL-RS(s) for multi-TRP based PUSCH transmission.

In some implementations, the default spatial relation and PL-RS(s) may be derived to perform multi-TRP based PUSCH transmission if the following conditions are satisfied.

The PUSCH transmission is scheduled by DC format 0_0 on serving cell c.

The UE is not provided with a spatial setting for PUCCH resources for the active UL BWP of the primary cell.

The UE is provided with an RRC parameter (e.g., enableDefaultBeamPL-ForMultiPUSCH0-0) that instructs the UE to apply default spatial relation information for multi-TRP based PUSCH transmission. In some implementations, an RRC parameter (e.g., enableDefaultBeamPL-ForMultiPUSCH0-0) may be used to instruct a UE to derive the default spatial relation and the corresponding PL-RS(s) to perform multi-TRP based PUSCH transmission. Such an RRC parameter (e.g., enableDefaultBeamPL-ForMulti-PUSCH0-0) may be included in the UplinkConfig field used to provide uplink channel related configuration. When enableDefaultBeamPL-ForMultiPUSCH0-0 is present in the UplinkConfig field, UE may derive the default spatial relation and the corresponding PL-RS(s) for multi-TRP based PUSCH transmission.

In some implementations, the default spatial relation and PL-RS(s) may be derived to perform multi-TRP based PUSCH transmission if the following conditions are satisfied.

The UE is provided with enableDefaultBeamPL-ForPUSCH0-0.

The PUSCH transmission is scheduled by DCI format 0_0 on serving cell c.

The UE is not provided with PUCCH resources for the active UL BWP of serving cell c.

The CORESET with the lowest ID on the active BWP is activated with two TCI states.

In some implementations, the default spatial relation and PL-RS(s) may be derived to perform multi-TRP based PUSCH transmission if the following conditions are satisfied.

The UE is provided with enableDefaultBeamPL-ForPUSCH0-0.

The PUSCH transmission is scheduled by DCI format 0_0 on serving cell c.

The UE is not provided with a spatial setting for PUCCH resources for the active UL BWP of the primary cell.

The CORESET with the lowest ID on the active BWP is activated with two TCI states.

In some implementations, the default spatial relation and PL-RS(s) may be derived to perform multi-TRP based PUSCH transmission if the following conditions are satisfied.

The UE is provided with enableDefaultBeamPL-ForPUSCH0-0.

The PUSCH transmission is scheduled by DCI format 0_0 on serving cell c.

The UE is not provided with PUCCH resources for the active UL BWP of serving cell c.

At least one CORESET on the active BWP is activated with two TC states.

In some implementations, the default spatial relation and PL-RS(s) may be derived to perform multi-TRP based PUSCH transmission if the following conditions are satisfied.

The UE is provided with enableDefaultBeamPL-ForPUSCH0-0.

The PUSCH transmission is scheduled by DCI format 0_0 on serving cell c.

The UE is not provided with a spatial setting for PUCCH resources for the active UL BWP of the primary cell.

At least one CORESET on the active BWP is activated with two TCI states.

In some implementations, the default spatial relation and PL-RS(s) may be derived to perform multi-TRP based PUSCH transmission if the following conditions are satisfied.

The UE is provided with enableDefaultBeamPL-For-PUSCH0-0.

The PUSCH transmission is scheduled by DCI format 0_0 on serving cell c.

The UE is not provided with a spatial setting for PUCCH resources for the active UL BWP of the primary cell.

Both CORESETs with the lowest ID and the second lowest ID on the active BWP are activated with one TCI state.

In some implementations, the default spatial relation and PL-RS(s) may be derived to perform multi-TRP based PUSCH transmission if the following conditions are satisfied.

The UE is provided with enableDefaultBeamPL-For-PUSCH0-0.

The PUSCH transmission is scheduled by DCI format 0_0 on serving cell c.

The UE is not provided with PUCCH resources for the active UL BWP of serving cell c.

Both CORESETs with the lowest ID and the second lowest ID on the active BWP are activated with one TC state.

In some implementations, the default spatial relation and PL-RS(s) may be derived to perform multi-TRP based PUSCH transmission if the following conditions are satisfied.

The UE is provided with an RRC parameter that instructs the UE to apply default spatial relation and PL-RS(s) for multi-TRP based or single-TRP based PUSCH transmission.

The PUSCH transmission is scheduled by DCI format 0_0 on serving cell c.

The PUCCH resource with the lowest ID on the active BWP is activated with two spatial settings.

In some implementations, the default spatial relation and PL-RS(s) may be derived to perform multi-TRP based PUSCH transmission if the following conditions are satisfied.

The UE is provided with an RRC parameter that instructs the UE to apply default spatial relation and PL-RS(s) for multi-TRP based or single-TRP based PUSCH transmission.

The PUSCH transmission is scheduled by DCI format 0_0 on serving cell c.

At least one PUCCH resource on the active BWP is activated with two spatial settings.

In view of the foregoing implementations, a UE may determine default spatial setting and/or PL-RS for multi-TRP based PUSCH transmission if at least one or any combination of the following conditions is satisfied:

The PUSCH transmission is scheduled by DCI format 0_0 on serving cell c.

The UE is not provided with PUCCH resources for the active UL BWP of serving cell C.

The UE is not provided with a spatial setting for PUCCH resources on the active UL BWP of the primary cell.

The UE is provided with enableDefaultBeamPL-For-PUSCH0-0.

The UE is provided with an RRC parameter (e.g., enableDefaultBeamPL-ForMultiPUSCH0-0) that instructs the UE to apply default spatial relation information for multi-TRP based PUSCH transmission.

The CORESET with the lowest ID on the active BWP is activated with two TCI states.

The PUCCH resource with the lowest ID on the active BWP is activated with two spatial settings.

At least one CORESET on the active BWP is activated with two TCI states.

At least one PUCCH resource on the active BWP is activated with two spatial settings.

Each of the CORESET with the lowest ID and the CORESET with the second lowest ID on the active BWP is activated with one TCI state.

Determination or Derivation of Default Spatial Relation and/or PL-RS(s) for Multi-TRP Based PUSCH Transmission If a UE performs (or is instructed to perform) multi-TRP based PUSCH transmission with default spatial relation and PL-RS, the default spatial relation and PL-RS may be derived based on at least one of the following alternatives:

A spatial setting for a PUSCH transmission from the UE is the same as or derived from a spatial setting for PDCCH receptions by the UE in the CORESET with the lowest ID on the active BWP of the serving cell. In some cases, the UE may be instructed to perform multi-TRP based PUSCH transmission with default spatial relation, but the UE may switch to single-TRP based PUSCH transmission with default spatial relation if the CORESET with the lowest ID on the active BWP of the serving cell is activated with only one TCI state. The default spatial relation may be derived by the TCI state of the CORESET with the lowest ID on the active BWP of the serving cell.

A spatial setting for a PUCCH transmission from the UE is the same as or derived from a spatial setting for PDCCH receptions by the UE in the CORESET which is activated with two TCI states with the lowest ID on the active BWP of the serving cell. In some cases, the UE may be instructed to perform multi-TRP based PUSCH transmission with default spatial relation, but the UE may switch to single-TRP based PUSCH transmission with default spatial relation if all CORESETs on the active BWP of the serving cell are activated with only one TCI state. The default spatial relation may be derived by the TCI state of the CORESET with the lowest ID on the active BWP of the serving cell.

A spatial setting for a PUSCH transmission from the UE is the same as or derived from a spatial setting of the PUCCH resource with the lowest ID on the active BWP. In some cases, the UE may be instructed to perform multi-TRP based PUSCH transmission with default spatial relation, but the UE may switch to single-TRP based PUSCH transmission with default spatial relation if the PUCCH resource with the lowest ID on the active BWP is activated with only one spatial setting. The default spatial relation may be derived by the spatial relation of the PUCCH resource with the lowest ID on the active BWP.

A spatial setting for a PUSCH transmission from the UE is the same as or derived from a spatial setting of the PUCCH resource which is activated with two TCI states with the lowest ID on the active BWP. In some cases, the UE may be instructed to perform multi-TRP based PUSCH transmission with default spatial relation, but the UE may switch to single-TRP based PUSCH transmission with default spatial relation if all PUCCH resources on the active BWP are activated with only one spatial setting. The default spatial relation may be derived by the spatial setting of the PUCCH resource with the lowest ID on the active BWP.

A spatial setting for a PUSCH transmission from the UE is the same as or derived from a spatial setting for PDCCH receptions by the UE in the CORESET with the lowest ID and/or the CORESET with the second lowest ID. In some cases, when the CORESET with the lowest ID is activated with two TCI states and the CORESET with the second lowest ID is activated with two TCI states, the default spatial relations may be derived by the TCI state with the lowest ID of both CORESETs for multi-TRP based PUSCH transmission. In some cases, when the CORESET with the lowest ID is activated with one TCI state and the CORESET with the second lowest ID is activated with two TCI states, the default spatial relations may be derived by the TCI state of the CORESET with the lowest ID and the TCI state with the lowest ID of the CORESET with the second lowest ID for multi-TRP based PUSCH transmission. In some cases, when the CORESET with the lowest ID is activated with two TCI states and the CORESET with the second lowest ID is activated with one TCI state, the default spatial relations may be derived by the TCI state with the lowest ID of the CORESET with the lowest ID and the TCI state of the CORESET with the second lowest ID for multi-TRP based PUSCH transmission. In some cases, when the CORESET with the lowest ID is activated with one TCI state and the CORESET with the second lowest ID is activated with one TC state, the default spatial relations may be derived by the TCI state of the CORESET with the lowest ID and the TCI state of the CORESET with the second lowest ID for multi-TRP PUSCH based transmission. It should be noted that if the CORESET with the lowest ID is activated with two TCI states, the default spatial relation may only be derived by the CORESET with the lowest ID for multi-TRP based PUSCH transmission; and if the CORESET with the lowest ID is activated with one TC state, the default spatial relation may be derived by the CORESET with the lowest ID and the CORESET with the second lowest ID for multi-TRP based PUSCH transmission.

A spatial setting for a PUSCH transmission from the UE is the same as or derived from a spatial setting of the PUCCH resource with the lowest ID and/or a spatial setting of the PUCCH resource with the second lowest ID. In some cases, when the PUCCH resource with the lowest ID is activated with two spatial settings and the PUCCH resource with the second lowest ID is activated with two spatial settings, the default spatial relations may be derived by the default spatial settings with the lowest ID of both the PUCCH resources for multi-TRP based PUSCH transmission. In some cases, when the PUCCH resource with the lowest ID is activated with two spatial settings and the PUCCH resource with the second lowest ID is activated with two spatial settings, the default spatial relations may be derived by the default spatial settings with the lowest ID of both the PUCCH resources for multi-TRP based PUSCH transmission. In some cases, when the PUCCH resource with the lowest ID is activated with two spatial settings and the PUCCH resource with the second lowest ID is activated with one spatial setting. The default spatial relations may be derived by the spatial setting with the lowest ID of the PUCCH resource with the lowest ID and the spatial setting of the PUCCH resource with the second lowest ID for multi-TRP based PUSCH transmission. In some cases, when the PUCCH resource with the lowest ID is activated with one spatial setting and the PUCCH resource with the second lowest ID is activated with one spatial setting, the default spatial relations may be derived by the spatial setting of the PUCCH resource with the lowest ID and the spatial setting of the PUCCH resource with the second lowest ID for multi-TRP PUSCH based transmission. It should be noted that if the PUCCH resource with the lowest ID is activated with two spatial settings, the default spatial relation may be only derived by the PUCCH resource with the lowest ID for multi-TRP based PUSCH transmission; and if the PUCCH resource with the lowest ID is activated with one spatial settings, the default spatial relation may be derived by the PUCCH resource with the lowest ID and the PUCCH resource with the second lowest ID for multi-TRP based PUSCH transmission.

The UE may determine an RS resource index $q_d$ providing a periodic RS resource configured with qcl-Type set to 'typeD' in the TCI state or the QCL assumption of a CORESET with the lowest index in the active DL BWP of the serving cell. In some cases, the UE may be instructed to perform multi-TRP based PUCSCH transmission with default PL-RSs, but the UE may switch to single-TRP based PUSCH transmission with default PL-RS if the CORESET with the lowest ID on the active BWP of the serving cell is only activated with one TCI state. The default PL-RS may be derived by the QCL assumption of the CORESET with the lowest ID on the active BWP of the serving cell.

The UE may determine an RS resource index $q_d$ providing a periodic RS resource configured with qcl-Type set to 'typeD' in the TCI state or the QCL assumption of a CORESET which is activated with two TCI states with the lowest ID on the active BWP of the serving cell. In some cases, the UE may be instructed to perform multi-TRP based PUSCH transmission with default PL-RSs, but the UE may switch to single-TRP based PUSCH transmission with default PL-RS if all CORESET on the active BWP of the serving cell are activated with only one TCI state. The default PL-RS may be derived by the QCL assumption of the CORESET with the lowest ID on the active BWP of the serving cell.

The UE may determine an RS resource index $q_d$ providing a periodic RS resource configured with qcl-Type set to 'typeD' in the TCI state or the RSs configured for a PUCCH resource with the lowest index on the active BWP.

The UE may determine an RS resource index $q_d$ providing a periodic RS resource configured with qcl-Type set to 'typeD' in the TCI state or the RSs configured for a PUCCH resource which is activated with two spatial settings with the lowest ID on the active BWP.

In view of the foregoing alternatives, if a UE applies/uses (or is instructed to apply/use) default spatial relation information and PL-RS for the spatial setting (e.g., beam and PL-RS setting) of multi-TRP based PUSCH transmission, a spatial setting for multi-TRP based transmission from the UE is the same as or derived from a spatial setting for PDCCH reception by the UE, e.g., the default spatial relation and PL-RS(s) may be derived by the spatial setting for PDCCH reception by the UE. The default spatial relation and PL-RS(s) may be derived based on one of the following options:

Option 1: The CORESET with the lowest ID on the active BWP of the serving cell. If the CORESET with the lowest ID is activated with two TCI states, these two TCI states may be directly applied for two default spatial relation information and PL-RSs used for a spatial setting for multi-TRP based PUSCH transmission. If the CORESET with the lowest ID is activated with one TCI state, this TCI state may be applied for two default spatial relation information and PL-RSs used for spatial setting for transmission, e.g., single-TRP based PUSCH transmission.

Option 2: The CORESET which is activated with two TCI states and is associated with the lowest ID on the active BWP of the serving cell. The TCI states of the CORESET activated with two TCI states with the lowest ID may be applied for two default spatial relation information used for a spatial setting for multi-TRP based PUSCH transmission.

Option 3: The PUCCH resource which is activated with two spatial settings and is associated with the lowest ID on the active BWP.

If the CORESET with the lowest ID is not activated with two TCI states, the UE may only apply one default spatial relation and PL-RS for PUSCH transmission. If all CORESETs are not activated with two TCI states, the UE may only apply one default spatial relation and PL-RS for PUSCH transmission. If the PUCCH resource with the lowest ID is not activated with two spatial settings, the UE may only apply one default spatial relation and PL-RS for PUSCH transmission. If all PUCCH resources are not activated with two spatial settings, the UE may only apply one default spatial relation and PL-RS for PUSCH transmission.

Figure 2:
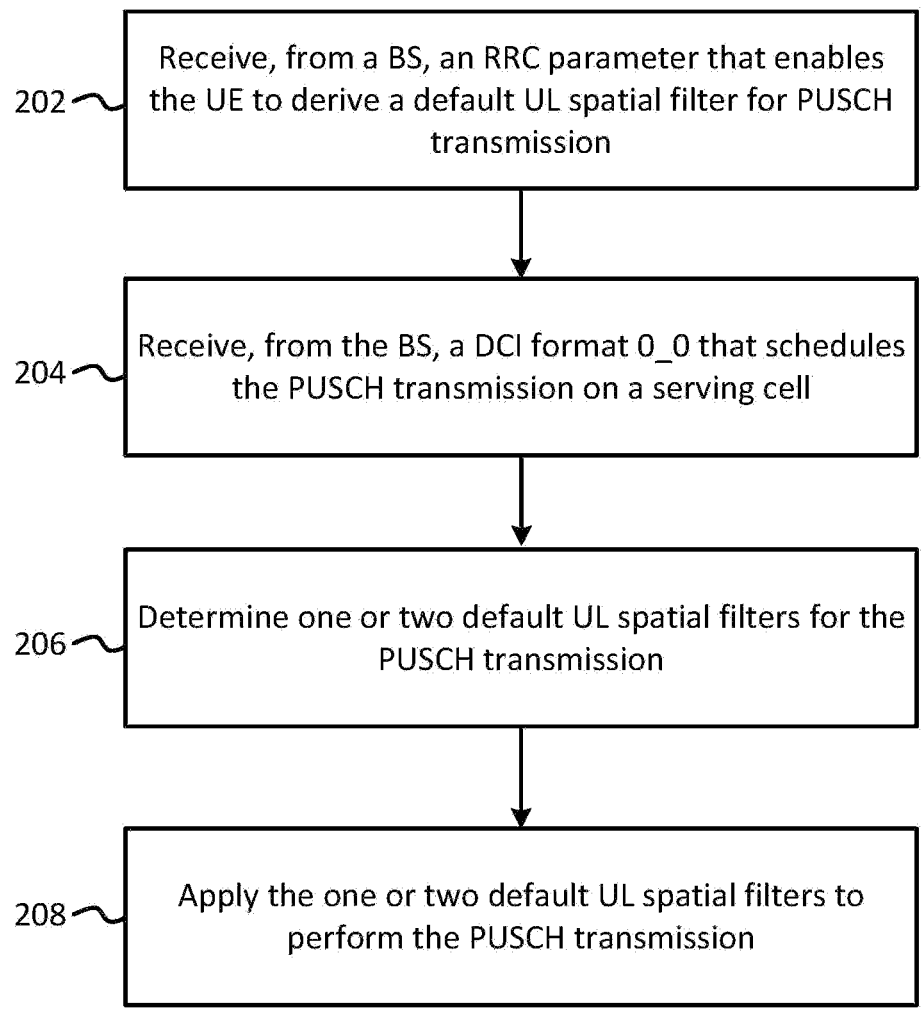
FIG. 2 is a flowchart illustrating a method/process performed by a UE for multi-TRP based PUSCH transmission, according to an example implementation of the present disclosure.

FIG. 2 is a flowchart illustrating a method/process 200 performed by a UE for multi-TRP based PUSCH transmission, according to an example implementation of the present disclosure. In action 202, the UE may receive, from a BS, an RRC parameter that enables the UE to derive a default UL spatial filter for PUSCH transmission. In action 204, the UE may receive, from the BS, a DCI format 0_0 that schedules the PUSCH transmission on a serving cell. In action 206, the UE may determine one or two default UL spatial filters for the PUSCH transmission. In action 208, the UE may apply the one or two default UL spatial filters to perform the PUSCH transmission.

In some implementations, the one or two default UL spatial filters are determined according to a first CORESET in a case that the UE has not been provided with at least one spatial setting for a first PUCCH resource on the serving cell, and the one or two default UL spatial filters are determined according to the first PUCCH resource in a case that the UE has been provided with at least one spatial setting for the first PUCCH resource.

In some implementations, the first CORESET is a CORESET with a lowest ID among a plurality of CORESETs configured by the BS.

In some implementations, the first PUCCH resource is a PUCCH resource with a lowest ID among a plurality of PUCCH resources configured by the BS.

In some implementations, in a case that the first PUCCH resource has been activated with two spatial settings, two default UL spatial filters are determined based on the two spatial settings and applied by the UE to perform multi-TRP based PUSCH transmission.

In some implementations, in a case that the first PUCCH resource has been activated with one spatial setting, one default UL spatial filter is determined based on the one spatial setting and applied by the UE to perform single-TRP based PUSCH transmission.

In some implementations, in a case that the first CORESET has been activated with two ULTCI states, two default UL spatial filters are determined based on the two ULTCI states and applied by the UE to perform multi-TRP based PUSCH transmission.

In some implementations, in a case that the first CORESET has been activated with one UL TCI state, one default UL spatial filter is determined based on the one UL TCI state and applied by the UE to perform single-TRP based PUSCH transmission.

In some implementations, the at least one spatial setting for the first PUCCH resource is provided to the UE via a MAC control element CE that activates the at least one spatial setting.

In some implementations, the RRC parameter may be a newly defined RRC parameter (e.g., enableDefaultBeamPLForMultiPUSCH0-0) that enables the UE to derive the default UL spatial filter for multi-TRP based PUSCH transmission.

Figure 3:
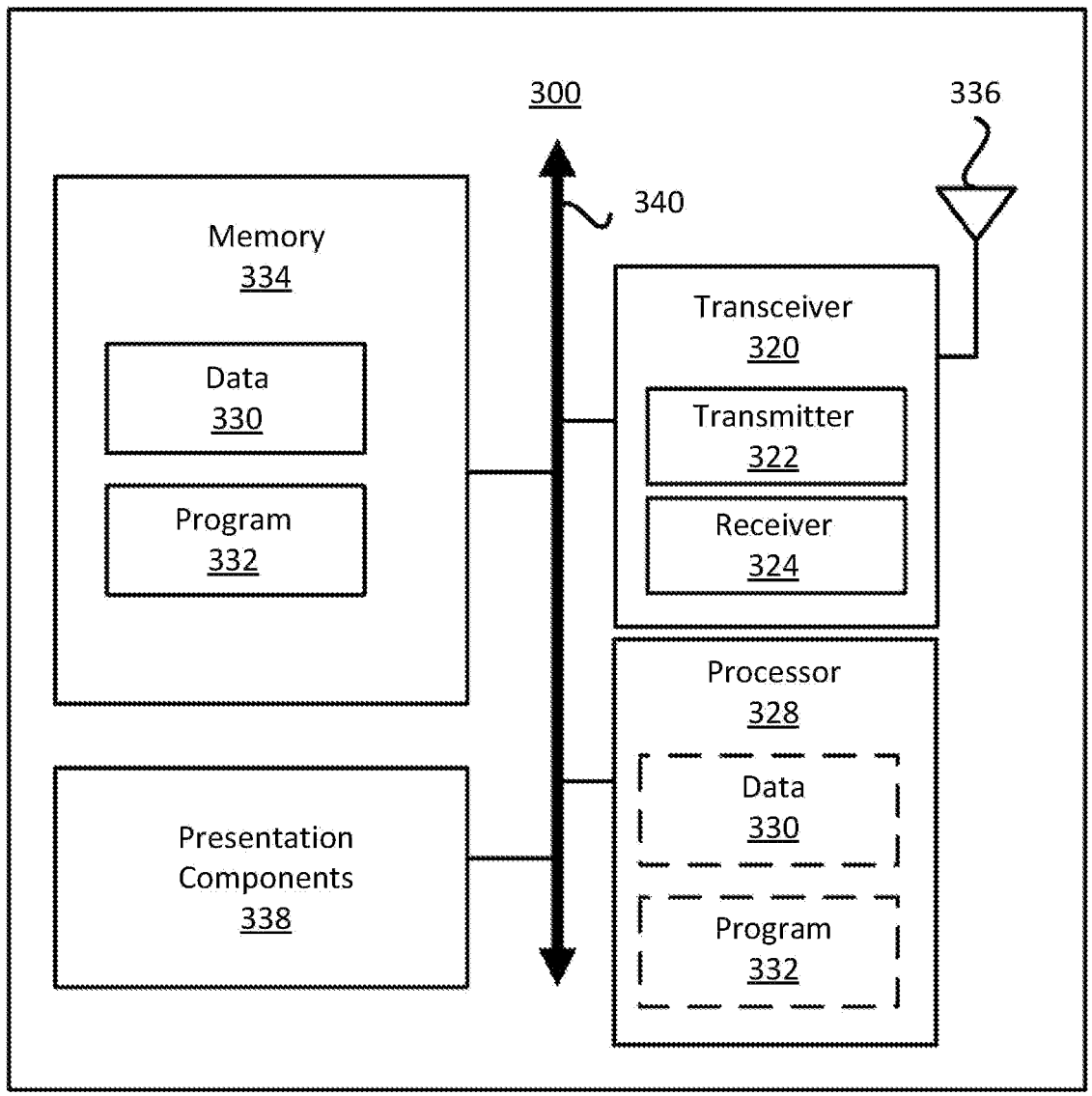
FIG. 3 is a block diagram illustrating a node for wireless communication in accordance with various aspects of the present disclosure.

FIG. 3 is a block diagram illustrating a node 300 for wireless communication in accordance with various aspects of the present disclosure. As illustrated in FIG. 3, a node 300 may include a transceiver 320, a processor 328, a memory 334, one or more presentation components 338, and at least one antenna 336. The node 300 may also include an RF spectrum band module, a BS communications module, a network communications module, and a system communications management module, Input/Output (I/O) ports, I/O components, and a power supply (not illustrated in FIG. 3).

Each of the components may directly or indirectly communicate with each other over one or more buses 340. The node 300 may be a UE or a BS that performs various functions disclosed with reference to FIGS. 1 to 2.

The transceiver 320 has a transmitter 322 (e.g., transmitting/transmission circuitry) and a receiver 324 (e.g., receiving/reception circuitry) and may be configured to transmit and/or receive time and/or frequency resource partitioning information. The transceiver 320 may be configured to transmit in different types of subframes and slots including but not limited to usable, non-usable and flexibly usable subframes and slot formats. The transceiver 320 may be configured to receive data and control channels.

The node 300 may include a variety of computer-readable media. Computer-readable media may be any available media that may be accessed by the node 300 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 334 may include computer-storage media in the form of volatile and/or non-volatile memory. The memory 334 may be removable, non-removable, or a combination thereof. Example memory may include solid-state memory, hard drives, optical-disc drives, etc. As illustrated in FIG. 3, the memory 334 may store a computer-readable and/or computer-executable program 332 (e.g., software codes) that are configured to, when executed, cause the processor 328 to perform various functions disclosed herein, for example, with reference to FIGS. 1 to 2. Alternatively, the program 332 may not be directly executable by the processor 328 but may be configured to cause the node 300 (e.g., when compiled and executed) to perform various functions disclosed herein.

The processor 328 (e.g., having processing circuitry) may include an intelligent hardware device, e.g., a Central Processing Unit (CPU), a microcontroller, an ASIC, etc. The processor 328 may include memory. The processor 328 may process the data 330 and the program 332 received from the memory 334, and information transmitted and received via the transceiver 320, the base band communications module, and/or the network communications module. The processor 328 may also process information to send to the transceiver 320 for transmission via the antenna 336 to the network communications module for transmission to a CN.

One or more presentation components 338 may present data indications to a person or another device. Examples of presentation components 338 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a user equipment (UE) for multiple transmission and reception points (multi-TRP) based physical uplink shared channel (PUSCH) transmission, the method comprising:
 receiving, from a base station (BS), a Radio Resource Control (RRC) parameter that enables the UE to determine two default uplink (UL) spatial filters for the multi-TRP based PUSCH transmission;
 receiving, from the BS, a downlink control indication (DCI) format 0_0 that schedules the multi-TRP based PUSCH transmission on a serving cell;
 determining the two default UL spatial filters for the multi-TRP based PUSCH transmission; and
 applying the two default UL spatial filters to perform the multi-TRP based PUSCH transmission, wherein:
 the two default UL spatial filters are determined based on a first control resource set (CORESET) in a case that the first CORESET has been activated with first and second Transmission Configuration Indication (TCI) states, and
 in a case that the first CORESET has been activated with the first TCI state, the two default UL spatial filters are determined based on the first CORESET and a second CORESET, such that:
  in a case that the second CORESET has been activated with a third TCI state, the two default UL spatial filters are determined based on the first TCI state and the third TCI state, and applied by the UE to perform the multi-TRP based PUSCH transmission, and
  in a case that the second CORESET has been activated with the third TCI state and a fourth TCI state, the two default UL spatial filters are determined based on the first TCI state and a TCI state with the lowest identifier (ID) among the third and fourth TCI states, and applied by the UE to perform the multi-TRP based PUSCH transmission.

2. The method of claim 1, wherein:
 the first CORESET is a CORESET with a lowest ID among a plurality of CORESETs configured by the BS, and
 the second CORESET is a CORESET with a second lowest ID among the plurality of CORESETs configured by the BS.

3. The method of claim 1, wherein in the case that the first CORESET has been activated with the first and second TCI states, the two default UL spatial filters are determined based on the first and second TCI states and applied by the UE to perform the multi-TRP based PUSCH transmission.

4. A user equipment (UE) for multiple transmission and reception points (multi-TRP) based physical uplink shared channel (PUSCH) transmission, the UE comprising:
 at least one processor; and
 at least one non-transitory computer-readable medium coupled to the at least one processor and storing one or more computer-executable instructions that, when executed by the at least one processor, cause the UE to:
 receive, from a base station (BS), a Radio Resource Control (RRC) parameter that enables the UE to determine two default uplink (UL) spatial filters for the multi-TRP based PUSCH transmission;
 receive, from the BS, a downlink control indication (DCI) format 0_0 that schedules the multi-TRP based PUSCH transmission on a serving cell;
 determine the two default UL spatial filters for the multi-TRP based PUSCH transmission; and
 apply the two default UL spatial filters to perform the multi-TRP based PUSCH transmission, wherein:
 the two default UL spatial filters are determined based on a first control resource set (CORESET) in a case that the first CORESET has been activated with first and second Transmission Configuration Indication (TCI) states, and
 in a case that the first CORESET has been activated with the first TCI state, the two default UL spatial filters are determined based on the first CORESET and a second CORESET, such that:
  in a case that the second CORESET has been activated with a third TCI state, the two default UL spatial filters are determined based on the first TCI state and the third TCI state, and applied by the UE to perform the multi-TRP based PUSCH transmission, and in a case that the second CORESET has been activated with the third TCI state and a fourth TCI state, the two default UL spatial filters are determined based on the first TCI state and a TCI state with the lowest identifier (ID) among the third and fourth TCI states, and applied by the UE to perform the multi-TRP based PUSCH transmission.

5. The UE of claim 4, wherein:
the first CORESET is a CORESET with a lowest ID among a plurality of CORESETs configured by the BS, and
the second CORESET is a CORESET with a second lowest ID among the plurality of CORESETs configured by the BS.

6. The UE of claim 4, wherein in the case that the first CORESET has been activated with the first and second TCI states, the two default UL spatial filters are determined based on the first and second TCI states and applied by the UE to perform the multi-TRP based PUSCH transmission.

* * * * *